(12) United States Patent
Kim et al.

(10) Patent No.: US 12,137,370 B2
(45) Date of Patent: Nov. 5, 2024

(54) METHOD AND ELECTRONIC DEVICE FOR SCHEDULING DL/UL TRAFFIC FOR WLAN-BASED AUGMENTED REALITY SERVICE

(71) Applicant: UNIST (ULSAN NATIONAL INSTITUTE OF SCIENCE AND TECHNOLOGY), Ulsan (KR)

(72) Inventors: Hyoil Kim, Ulsan (KR); Seokwoo Choi, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 344 days.

(21) Appl. No.: 17/824,442

(22) Filed: May 25, 2022

(65) Prior Publication Data

US 2023/0217303 A1    Jul. 6, 2023

(30) Foreign Application Priority Data

Dec. 31, 2021   (KR) .................. 10-2021-0193687
May 17, 2022   (KR) .................. 10-2022-0060287

(51) Int. Cl.
*H04W 28/02*       (2009.01)
*H04L 67/131*      (2022.01)
*H04W 74/08*       (2009.01)
*H04W 84/12*       (2009.01)

(52) U.S. Cl.
CPC ....... *H04W 28/0278* (2013.01); *H04L 67/131* (2022.05); *H04W 74/08* (2013.01); *H04W 84/12* (2013.01)

(58) Field of Classification Search
CPC . H04W 28/0278; H04W 74/08; H04W 84/12; H04W 74/085; H04L 67/131
See application file for complete search history.

(56) References Cited

U.S. PATENT DOCUMENTS

| | | | |
|---|---|---|---|
| 7,978,636 B2 | 7/2011 | Gaur | |
| 9,077,528 B2 | 7/2015 | Kang et al. | |
| 10,070,386 B2 | 9/2018 | Dinh et al. | |
| 10,070,429 B2 | 9/2018 | Lee et al. | |
| 10,278,208 B2 | 4/2019 | Choi et al. | |
| 2009/0161682 A1* | 6/2009 | Johnson | H04L 12/66 370/468 |
| 2012/0182867 A1* | 7/2012 | Farrag | H04J 3/16 370/230 |
| 2021/0068094 A1* | 3/2021 | Chen | H04W 74/006 |

(Continued)

FOREIGN PATENT DOCUMENTS

| | | |
|---|---|---|
| JP | 2004-153558 A | 5/2004 |
| JP | 2008-245278 A | 10/2008 |

(Continued)

*Primary Examiner* — Afshawn M Towfighi
(74) *Attorney, Agent, or Firm* — Sughrue Mion, PLLC

(57) ABSTRACT

Provided is a method, performed by an electronic device, of scheduling downlink (DL)/uplink (UL) traffic for an augmented reality (AR) service based on a wireless local area network (WLAN). The method includes a period arrangement operation of arranging a contention period (CP) at both sides of a contention free period (CFP) in a preset capture interval (I) and an AR traffic allocation operation of allocating AR traffic including UL traffic and DL traffic to the CFP.

10 Claims, 9 Drawing Sheets

(56) References Cited

U.S. PATENT DOCUMENTS

| | | | |
|---|---|---|---|
| 2023/0217303 A1* | 7/2023 | Kim | H04W 28/0278 370/329 |
| 2024/0137144 A1* | 4/2024 | Chun | H04L 69/322 |
| 2024/0193079 A1* | 6/2024 | Moon | G06F 12/023 |

FOREIGN PATENT DOCUMENTS

| | | |
|---|---|---|
| KR | 10-2016-0058692 A | 5/2016 |
| KR | 10-1709421 B1 | 2/2017 |
| KR | 10-2017-0036455 A | 4/2017 |
| KR | 10-2017-0105035 A | 9/2017 |
| KR | 10-2020-0127698 A | 11/2020 |
| KR | 10-2221395 B1 | 3/2021 |
| KR | 10-2021-0127633 A | 10/2021 |
| WO | 2014/043463 A2 | 3/2014 |

* cited by examiner

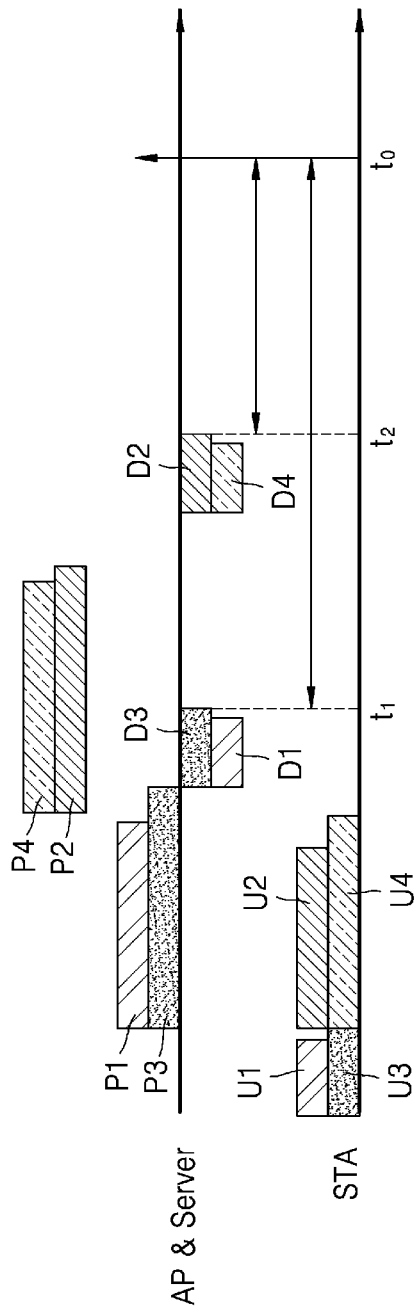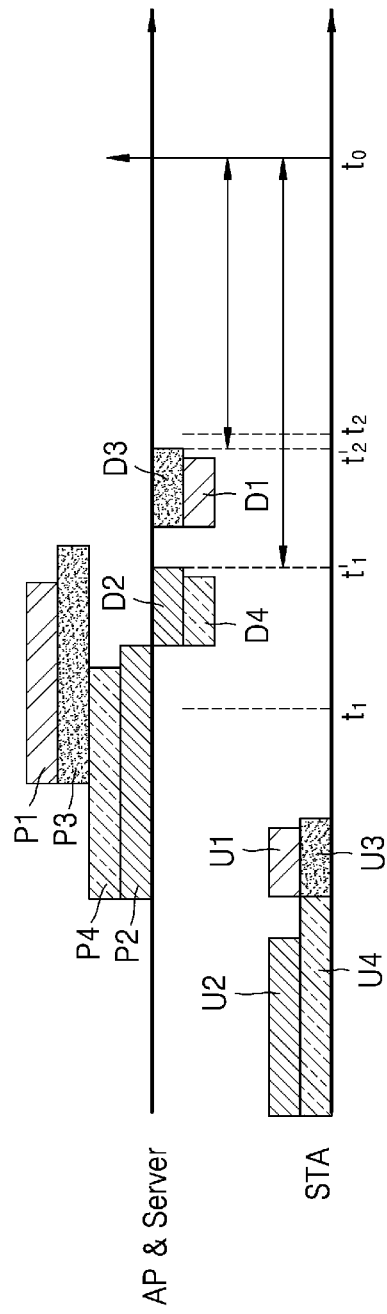

METHOD AND ELECTRONIC DEVICE FOR SCHEDULING DL/UL TRAFFIC FOR WLAN-BASED AUGMENTED REALITY SERVICE

CROSS REFERENCE TO RELATED APPLICATION(S)

This application claims priority under 35 U.S.C. § 119(e) to a Korean patent application number 10-2021-0193687, filed on Dec. 31, 2021, in the Korean Intellectual Property Office, and priority under 35 U.S.C. § 119(e) to a Korean patent application number 10-2022-0060287, filed on May 17, 2022, in the Korean Intellectual Property Office. The above-identified patent applications are hereby incorporated by reference in their entireties.

TECHNICAL FIELD

One or more embodiments relate to a method and electronic device for scheduling downlink (DL)/uplink (UL) traffic for an augmented reality (AR) service based on a wireless local area network (WLAN), and more particularly, to a method and electronic device for scheduling DL/UL traffic for a WLAN-based AR service in which AR traffic transmitted and received between at least one AR device and an edge server is scheduled to minimize latency in AR image output to an AR device and to provide an AR service having an improved output accuracy of a virtual object.

BACKGROUND

Augmented reality (AR) is a content providing scheme that synthesizes a virtual environment in a real environment sensed by user's senses to allow the user to feel like the virtual environment exists in the original real environment. Unlike virtual reality (VR) that targets a virtual space and a virtual object, AR may supplement and provide new additional information that is difficult to obtain merely with the real world, by synthesizing the virtual object in the real world.

When an AR service is provided to the user, a time difference occurs between a time point when a motion of the user or the real world is generated and a time point when the virtual object corresponding to the motion is output, such that the user may complain of motion sickness such as feeling dizzy during an AR experience or may lose interest in the AR service due to incorrect calculation of a location of the virtual object.

As related art, Korean Patent Publication Gazette No. 10-2016-0058692 (Title: Method and Apparatus for Transmitting Control Information in Low-Latency Mobile Communication System), etc., has been disclosed. According to the related art, after latency requirements are obtained from terminals, a time interval for transmitting control information for each terminal based on the latency requirements may be determined, but in this case, the transmission time interval is determined after the requirements of the terminals are identified, resulting in technical limitations in scheduling.

Thus, there is a new need for a traffic scheduling technique for minimizing latency of AR image output for a plurality of terminals generating traffic.

SUMMARY

One or more embodiments include a method of scheduling downlink (DL)/uplink (UL) traffic for an augmented reality (AR) service based on a wireless local area network (WLAN), in which to address motion sickness caused by AR image output delay occurring in providing the AR service and improve the accuracy of output time point and position of a virtual object, a contention period (CP) is arranged at both sides of a contention-free period (CFP) in a preset capture interval (I) and AR traffic is allocated to the CFP.

The technical problems to be achieved by embodiments of the present disclosure are not limited to the written problems, and various technical problems may be inferred from the following embodiments.

According to one or more embodiments, a method of scheduling downlink (DL)/uplink (UL) traffic for an AR service based on a WLAN includes a period arrangement operation of arranging a contention period (CP) at both sides of a contention free period (CFP) in a preset capture interval (I) and an AR traffic allocation operation of allocating AR traffic including UL traffic and DL traffic to the CFP.

In an embodiment of the disclosure, the method may further include a non-AR traffic allocation operation of allocating non-AR traffic to the CP.

In an embodiment of the disclosure, the AR traffic allocation operation may include an UL information identification operation of identifying UL information received from at least one AR device through a buffer state report (BSR) frame after declaration of start of the CFP and a UL traffic transmission operation of transmitting at least one UL traffic to an edge server based on the identified UL information.

In an embodiment of the disclosure, the AR traffic allocation operation may further include an UL grouping operation of grouping at least one UL traffic using a multi-user multiple input multiple output (MU-MIMO) transmission scheme based on the identified UL information to reduce the sum airtime of the at least one UL traffic and generating at least one UL traffic group. The UL traffic transmission operation may include an operation of transmitting the at least one UL traffic group to the edge server.

In an embodiment of the disclosure, the UL traffic transmission operation may include transmitting the at least one UL traffic group to the edge server in order of shortest group airtime to secure a decoding time of the DL traffic.

In an embodiment of the disclosure, the AR traffic allocation operation may include a DL traffic transmission operation of receiving at least one DL traffic determined by processing of the at least one UL traffic from the edge server and transmitting the received at least one DL traffic to at least one AR device. Before declaration of end of the CFP through a contention free end (CF-End) frame, the at least one DL traffic may be transmitted to the at least one AR device. For example, after the at least one DL traffic is transmitted to the at least one AR device in the DL traffic transmission operation, end of the CFP may be declared through the CF-End frame.

In an embodiment of the disclosure, the AR traffic allocation operation may further include a DL grouping operation of grouping the at least one DL traffic using the MU-MIMO transmission scheme in an order in which processing is finished from the edge server, and generating at least one DL traffic group. The DL traffic transmission operation may include an operation of transmitting the at least one DL traffic group to the at least one AR device.

In an embodiment of the disclosure, the DL grouping operation may include grouping the at least one DL traffic based on a correlation between radio channels of the at least one AR device.

An electronic device for scheduling downlink (DL)/uplink (UL) traffic for an augmented reality (AR) service based on a wireless local area network (WLAN) includes a transceiver, a memory to store at least one instruction, and at least one processor to execute the at least one instruction stored in the memory. The processor may be further configured to, by executing the at least one instruction, arrange a contention period (CP) at both sides of a contention free period (CFP) in a preset capture interval (I) and allocate AR traffic including UL traffic and DL traffic to the CFP.

A computer-readable recording medium disclosed as a technical means for achieving the above-described technical problems may have stored therein a program for executing at least one of embodiments of the disclosed method on a computer.

According to a method and electronic device for scheduling DL/UL traffic for an AR service based on a WLAN proposed in the disclosure, by arranging a CP at both sides of a CFP in a preset I and allocating AR traffic to the CFP, motion sickness caused by AR image output delay occurring in providing the AR service may be alleviated and the accuracy of output time point and position of a virtual object may be improved.

Effects of embodiments of the disclosure are not limited to the effects mentioned above, and other effects not mentioned will be clearly understood by those of ordinary skill in the art from the detailed description and description of the claims.

BRIEF DESCRIPTION OF THE DRAWINGS

For a more complete understanding of this disclosure and its advantages, reference is now made to the following description, taken in conjunction with the accompanying drawings, in which:

FIGS. 7A and 7B are views for describing a length of a group airtime and a traffic transmission order of a UL traffic group, according to an embodiment of the disclosure;

DETAILED DESCRIPTION

Figure 1:
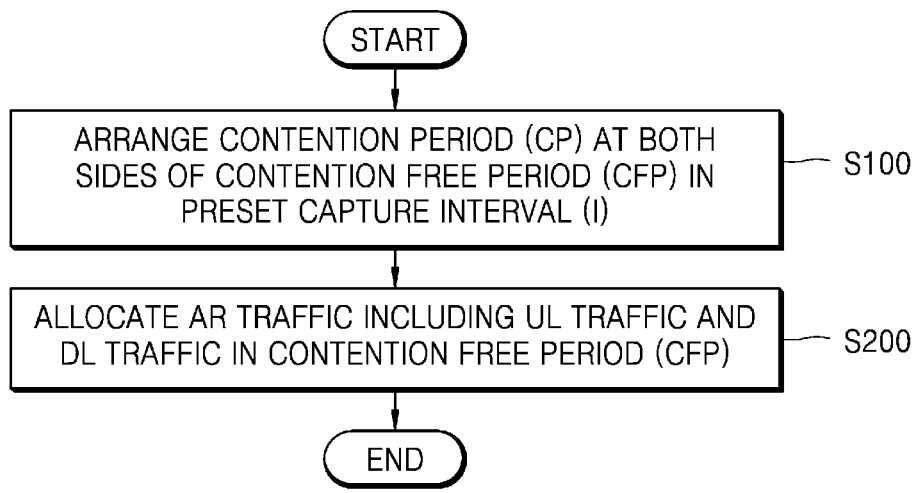
FIG. 1 is a flowchart of a method of scheduling downlink (DL)/uplink (UL) traffic for an augmented reality (AR) service based on a wireless local area network (WLAN), according to an embodiment of the disclosure.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Although terms used in embodiments of the disclosure are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of an embodiment of the disclosure. Thus, the terms used in herein should be defined not by the simple names of the terms but by the meaning of the terms and the contents throughout the disclosure.

It is to be understood that the singular forms include plural references unless the context clearly dictates otherwise. All of the terms used herein including technical or scientific terms have the same meanings as those generally understood by those of ordinary skill in the art of the disclosure, unless they are defined other. The terms defined in a generally used dictionary should be interpreted as having the same meanings as the contextual meanings of the relevant technology and should not be interpreted as having ideal or exaggerated meanings unless they are clearly defined in the present application.

Throughout the entirety of the specification of the disclosure, when it is assumed that a certain part includes a certain component, the term 'including' means that a corresponding component may further include other components unless specially described to the contrary. The term used herein such as " . . . unit" or " . . . module" indicates a unit for processing at least one function or operation, and may be implemented in hardware, software, or in a combination of hardware and software.

Throughout the specification, when any portion is "connected" to another portion, it may include not only a case where they are "directly connected", but also a case where they are "electrically connected" with another element therebetween.

Expression used in the present specification " . . . configured to" may be exchangeably used with, for example, " . . . suitable for", " . . . having the capacity to", . . . designed to", " . . . adapted to", " . . . made to", or " . . . capable of", depending on a situation. The term " . . . configured to" may not necessarily mean " . . . specially designed to" in terms of hardware. Instead, in a certain situation, the expression "a system configured to . . . " may mean that the system is "capable of . . . " together with other devices or parts. For example, the phrase "a processor configured (or set) to perform A, B, and C" may mean a dedicated processor (e.g., an embedded processor) for performing a corresponding operation or a general-purpose processor (e.g., a central processing unit (CPU) or an application processor) capable of performing corresponding operations by executing one or more software programs stored in a memory.

It may be understood that combinations of blocks of processing flowcharts and combinations of flowcharts are performed by computer program instructions. These computer program instructions may be mounted on a general-purpose computer, a special-purpose computer, or a processor of other programmable data processing equipment, such that the instructions performed by the computer or the processor of other programmable data processing equipment may generate a means for performing functions described in flowchart block(s). These computer program instructions may be stored in a computer-available or computer-readable memory that may be aimed at computer or other programmable data processing equipment to implement functions in a specific way, such that the instructions stored in the computer-available or computer-readable memory may also produce manufacturing items that contain instruction means performing functions described in the flowchart block(s). The computer program instructions may be mounted on computer or other programmable data processing equipment, and a series of operations may be performed on the computer or other programmable data processing equipment to provide operations for executing functions described in flowchart block(s).

In addition, each block may indicate a part of a module, segment or code including one or more executable instructions for executing specific logical function(s). Moreover, it should be noted that in some alternative examples, functions mentioned in the blocks may occur out of order. For example, two blocks shown one after another may be actually carried out at the same time, or the blocks may be performed in reverse order according to corresponding functions sometimes.

Hereinafter, a method and electronic device for scheduling downlink (DL)/uplink (UL) traffic for a wireless local area network (WLAN)-based augmented reality (AR) service according to an embodiment of the disclosure will be described in detail with reference the accompanying drawings.

FIG. 1 is a flowchart of a method, performed by an electronic device, of scheduling DL/UL traffic for a WLAN-based AR service according to an embodiment of the disclosure.

Referring to FIG. 1, a method, performed by an electronic device, of scheduling DL/UL traffic for a WLAN-based AR service according to an embodiment of the disclosure may include period arrangement operation S100 of arranging a contention period (CP) at both sides of a contention free period (CFP) in a preset capture interval (I), and AR traffic allocation operation S200 of allocating AR traffic including UL traffic and DL traffic to the CFP.

In an embodiment of the disclosure, the method may further include a non-AR traffic allocation operation of allocating non-AR traffic to the CP.

AR traffic allocation operation S200 may include an UL information identification operation of identifying UL information received from at least one AR device (or station STA) through a buffer state report (BSR) frame after declaration of start of the CFP and a UL traffic transmission operation of transmitting at least one UL traffic to an edge server based on the identified UL information.

In an embodiment of the disclosure, AR traffic allocation operation S200 may further include an UL grouping operation of grouping the at least one UL traffic using a multi-user multiple input multiple output (MU-MIMO) transmission scheme based on the identified UL information and generating at least one UL traffic group. The UL traffic transmission operation may include an operation of transmitting the at least one UL traffic group to the edge server. When the UL traffic group grouped using the MU-MIMO transmission scheme is transmitted to the edge server, a sum airtime of a plurality of UL traffics may be reduced. In an embodiment of the disclosure, in the UL traffic transmission operation, the at least one UL traffic group may be transmitted to the edge server in order of shortest group airtime to secure a decoding time of DL traffic.

AR traffic allocation operation S200 may include a DL traffic transmission operation of receiving at least one DL traffic determined by processing of the at least one UL traffic from the edge server and transmitting the received at least one DL traffic to at least one AR device. In this case, before declaration of end of the CFP through a contention free end (CF-End) frame, the at least one DL traffic may be transmitted to the at least one AR device. For example, after a plurality of DL traffics all are transmitted to an access point (AP) in the DL traffic transmission operation, the end of the CFP may be declared through the CF-End frame.

In an embodiment of the disclosure, AR traffic allocation operation S200 may further include a DL grouping operation of grouping the at least one DL traffic using the MU-MIMO transmission scheme in an order in which processing is finished from the edge server, and generating at least one DL traffic group. In this case, the DL traffic transmission operation may include an operation of transmitting the at least one DL traffic group to the at least one AR device. In an embodiment of the disclosure, the DL grouping operation may include grouping the at least one DL traffic based on a correlation between radio channels of the at least one AR device.

A system for implementing an embodiment of the disclosure may include at least one AR device (e.g., a station (STA)) provided to allow each user to receive the AR service, an electronic device (e.g., an AP) to adjust AR traffic transmitted and received between the at least one AR device and the edge server, and the edge server for computation offloading. The electronic device and the edge server may be wiredly or wirelessly connected to enable communication, and the at least one AR device and the electronic device may be wirelessly connected through Wireless Fidelity (WiFi), etc., to enable communication.

Figure 2:
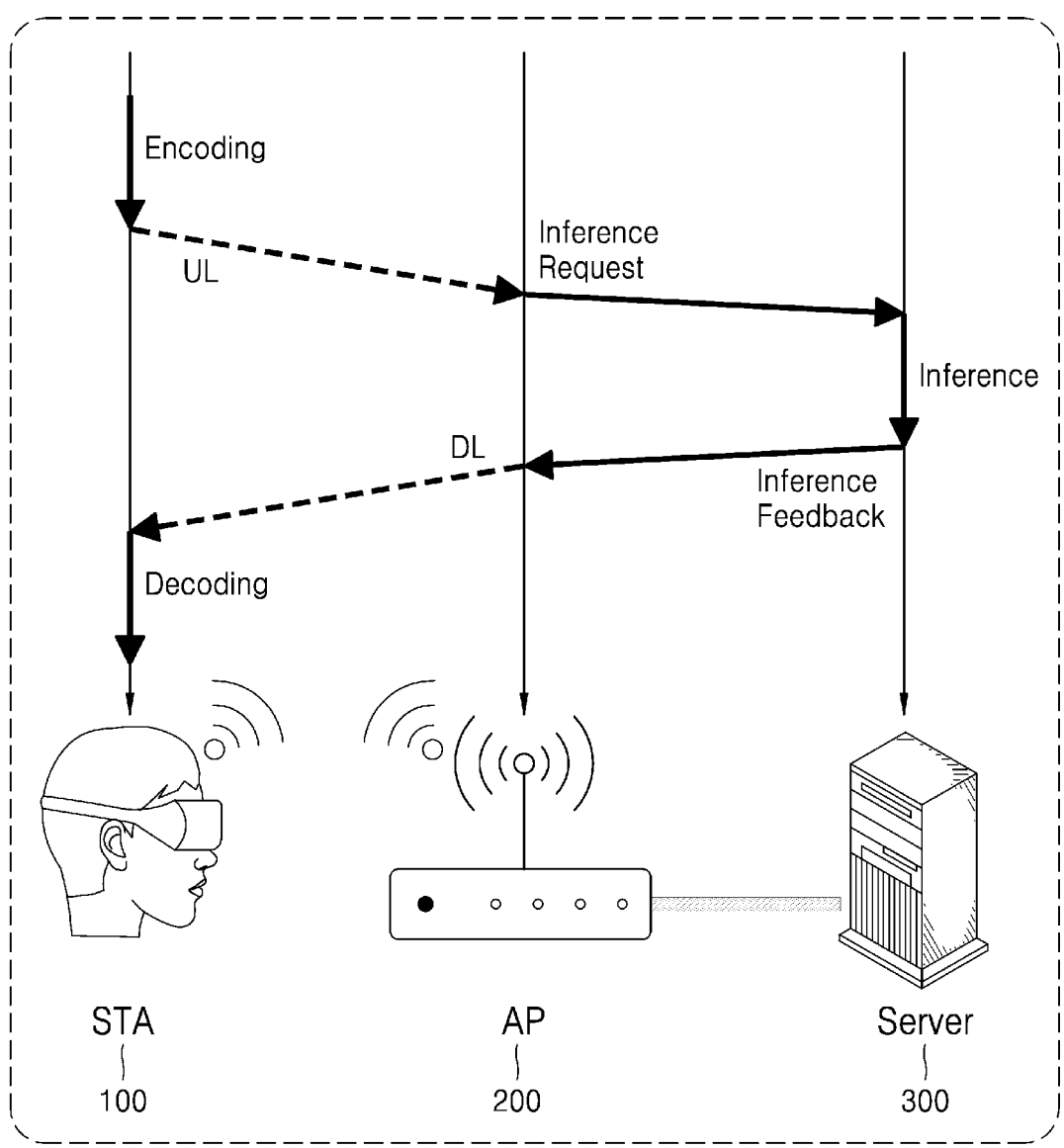
FIG. 2 is a view for describing an operation of transmitting and receiving AR traffic in at least one AR device, an electronic device, and an edge server, according to an embodiment of the disclosure.

FIG. 2 is a view for describing an operation of transmitting and receiving AR traffic in at least one AR device STA 100, an electronic device AP 200, and an edge server 300, according to an embodiment of the disclosure.

Referring to FIG. 2, the AR traffic is transmitted and received among the at least one AR device STA 100, the electronic device AP 200, and the edge server 300 as below. First, UL traffic may be generated in each of the at least one AR device STA 100. The UL traffic may be data regarding a user's motion measured from an inertial measurement unit (IMU) included in the at least one AR device STA 100 or a video frame captured from a camera included in the at least one AR device STA 100. The at least one AR device STA 100 may encode the UL traffic to enable data processing in the electronic device AP 200 and the edge server 300. The encoded UL traffic may be transmitted to the edge server 300 through the electronic device AP 200, and the edge server 300 may perform task processing based on the UL traffic and then generate DL traffic as part of feedback.

For example, task processing may involve an AR task. A task processing operation may include an inference operation, a bounding operation, a segmentation operation, an object recognition operation, an object classification operation, an object tracking operation, an AR data generation operation, a data storing and finding operation, an operation of processing a user instruction, a computing operation, a rendering operation, or various operations performed in the edge server 300 (or performed in the edge server 300 with the assistance of a cloud server).

The object recognition operation may indicate, for example, an operation of identifying an AR object in a specific video frame. The object classification operation may indicate an operation of classifying AR objects identified in the specific video frame according to a preset criterion. The criterion for classifying objects may be related to, for example, characteristics of the objects. The object tracking operation may indicate, for example, an operation of positions of objects in a specific video frame. The AR data generation operation may indicate, for example, an operation of generating various data related to an AR service, such as an AR image, annotation, etc. The data storing and finding operation may indicate, for example, an operation of storing the AR image, the annotation data, etc., generated previously, in a memory or finding the same from the memory. The rendering operation may include an operation of synthesizing the AR image in an actually captured video frame.

For example, the DL traffic may include information about a virtual object corresponding to a user's motion in the AR, a motion of the virtual object, etc. The DL traffic may be transmitted to the at least one AR device STA 100 through the electronic device AP 200, and may be output after decoded in the at least one AR device STA 100.

The key point in the AR service is to provide a smooth AR environment. To provide the smooth AR environment, a time difference between a time point when a motion of the user or the real environment is generated and a time point when an image generated corresponding to the motion is output to each of the at least one AR device STA 100 has to be maintained below a certain level. When a certain level of delay performance is not met, the user may experience motion sickness and the accuracy of output time point and output position of a virtual object image may be degraded. This may deteriorate a degree to which the user satisfies the AR service.

To reduce AR image output delay that may occur in providing the AR service and to provide the smooth AR environment, encoding and decoding with respect to transmitted and received data are required, resulting in a need for traffic scheduling based on a time in which the AR traffic is encoded and decoded from the at least one AR device STA 100. Moreover, traffic scheduling based on a time to be consumed for an operation of generating DL traffic, which is an AR feedback frame, through task processing such as inference, etc., in the edge server 300, is also required.

In traffic scheduling, referring to the Institute of Electrical and Electronics Engineers (IEEE) 802.11 standard wireless medium access control (MAC) technology, the electronic device AP 200 and the AR device STA 100 may transmit data while respectively occupying a channel through distributed coordination function (DCF)-based contention technology. In this case, a random content time is caused during channel contention (or channel access), such that additional random contention overhead occurs as well as a packet transmission time in every attempt of transmission. Thus, in DCF-based AR traffic transmission/reception, a consumed time is difficult to predict and it may become further difficult to satisfy latency requirements for each packet due to the additionally occurring contention overhead. This problem may be aggravated in an environment where AR traffic transmission/reception are frequently attempted due to a large number of AR devices STA 100.

In addition, referring to the IEEE 802.11 standard wireless MAC technology, the electronic device AP 200 may recognize the traffic of each AR device STA 100 through PCF-based polling and then lead channel allocation by using a contention free (CF)-poll frame. In this case, a deterministic latency may be determined and guaranteed channel occupation may be achieved, but unnecessary CF-poll frame overhead may be caused.

Therefore, the disclosure may allocate the CFP and the CP under the coordination of the electronic device AP 200 through the above-described period arrangement operation S100 of FIG. 1 based on the AR environment. A more detailed operation of period arrangement operation S100 will be described with reference to FIG. 3 to be described later.

Figure 3:
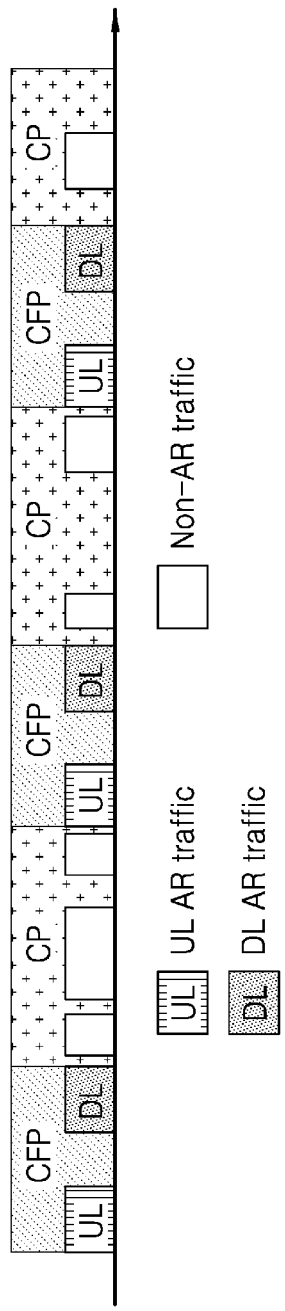
FIG. 3 is a view for describing an operation of allocating AR traffic to a contention free period (CFP) in a method of scheduling DL/UL traffic for a WLAN-based AR service, according to an embodiment of the disclosure.

FIG. 3 is a view for describing an operation of allocating AR traffic to a CFP in a method of scheduling DL/UL traffic for a WLAN-based AR service, according to an embodiment of the disclosure.

Referring to FIG. 3, in period arrangement operation S100, the electronic device may respectively allocate a CFP for AR traffic transmission and a CP for non-AR traffic transmission as the electronic device AP declares a CFP of a random length using a random CFP declaration scheme.

For example, in period arrangement operation S100 based on hybrid coordination function (HCF) controlled channel access (HCCA), when a beacon is transmitted from the electronic device AP, the start of the CFP may be declared in such a way that a channel occupation period (a network allocation vector (NAV)) of at least one AR device STA existing in a wireless communication network is set as long as a length of the CFP. In period arrangement operation S100, when a CF-End frame is transmitted from the electronic device AP, the NAV of the preset AR device STA may be initialized to 0 and thus the CFP may end. Moreover, in period arrangement operation S100, the start of a CP to be arranged after the CFP may be declared from the electronic device AP. Referring to FIG. 3, in period arrangement operation S100, the CFP and the CP may be arranged alternately. In an embodiment of the disclosure, an image capture time point of the AR device STA may be within the CP. In this case, in the I identified between two consecutive image capture time points, the CP may be arranged at both sides of the CFP.

Thereafter, in AR traffic allocation operation S200, both UL traffic and DL traffic may be allocated within the CFP.

Figure 4A:
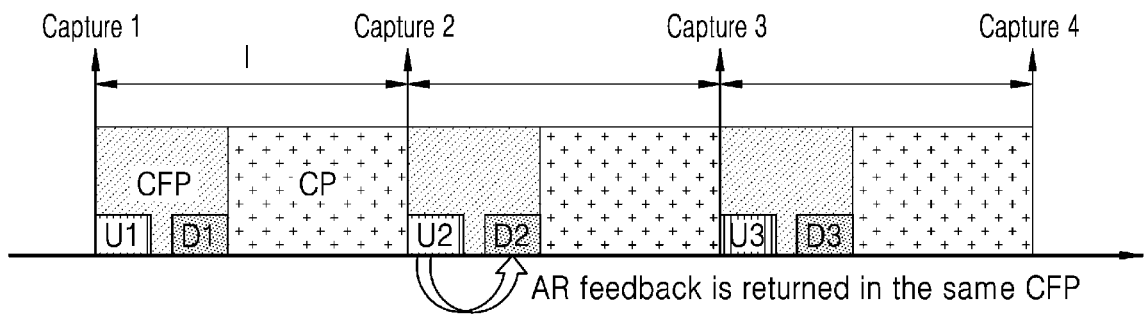
FIGS. 4A, 4B, and 4C are views for describing an operation of allocating AR traffic in a method of scheduling DL/UL traffic for a WLAN-based AR service, according to an embodiment of the disclosure.
Figure 4B:
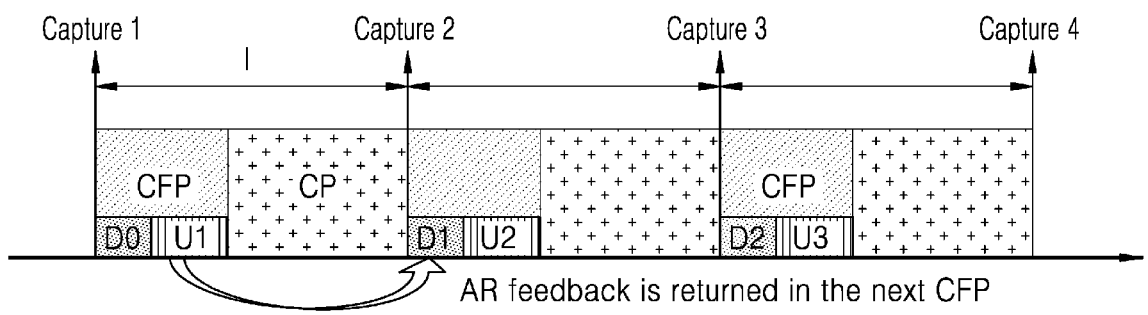
Figure 4C:
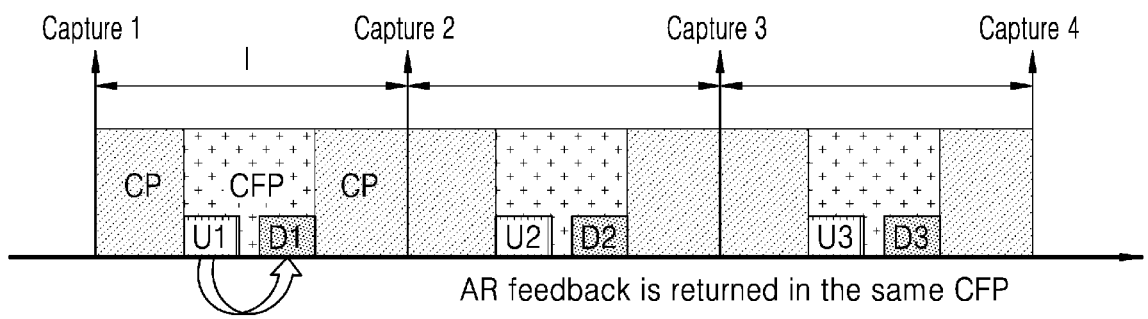

FIGS. 4A, 4B, and 4C are views for describing an operation of allocating AR traffic in a method of scheduling DL/UL traffic for a WLAN-based AR service, according to an embodiment of the disclosure.

Referring to FIG. 4A, one CFP and one CP may be included in the preset I identified between two consecutive image capture time points, and AR traffic may be transmitted and received within the same CFP. In this case, a time for encoding UL traffic from at least one AR device STA in a specific CFP may become insufficient.

Referring to FIG. 4B, one CFP and one CP are included in the preset I, and DL traffic may be allocated to a CFP next to a CFP to which the UL traffic is allocated. The DL traffic may indicate traffic transmitted from the edge server as part of feedback of the corresponding UL traffic. When the DL traffic is allocated to a CFP of an I that is different from that of the corresponding UL traffic, a maximum latency required to avoid user's motion thickness may be difficult to satisfy. In the embodiment of the disclosure as shown in FIG. 4B, an output delay likely to occur in the AR device STA may be greater than or equal to twice the I. For example, a frame rate of the AR device STA may be about 60 fps, and in this case, the I may be about 16.67 ms. In this case, the output delay that may occur in the AR device STA may be greater than or equal to about 33.34 ms, making it difficult to satisfy latency requirements for providing an AR service of good quality.

Referring to FIG. 4C, the CP may be arranged at both sides of the CFP within the preset I, and the AR traffic may be transmitted and received in the same CFP. In this case, the CP is allocated between a capture time point and an UL traffic allocation time point, thus securing a time for encoding the AR traffic. Moreover, another CP is allocated between a DL traffic allocation time point and the next capture time point, thus securing a time for decoding the AR traffic. Therefore, the latency requirements for providing the good-quality AR service may be satisfied.

In an embodiment of the disclosure, the I may indicate a video capture interval for at least one AR device STA to capture video or a motion capture interval for capturing user's motion.

According to an embodiment of the disclosure, optimized traffic scheduling may be possible which is capable of significantly reducing the output delay of the AR device STA while using the IEEE 802.11 standard wireless MAC technology, and considers encoding and decoding times.

In an embodiment of the disclosure, AR traffic allocation operation S200 may include an UL information identification operation of identifying UL information received from at least one AR device STA through a BSR frame after declaration of start of the CFP and a UL traffic transmission operation of transmitting at least one UL traffic to an edge server based on the identified UL information. For example, AR traffic allocation operation S200 may include transmitting at least one UL traffic to an edge server based on UL information including the size of UL traffic, instead of transmitting at least one UL traffic to the edge server at random.

Figure 5:
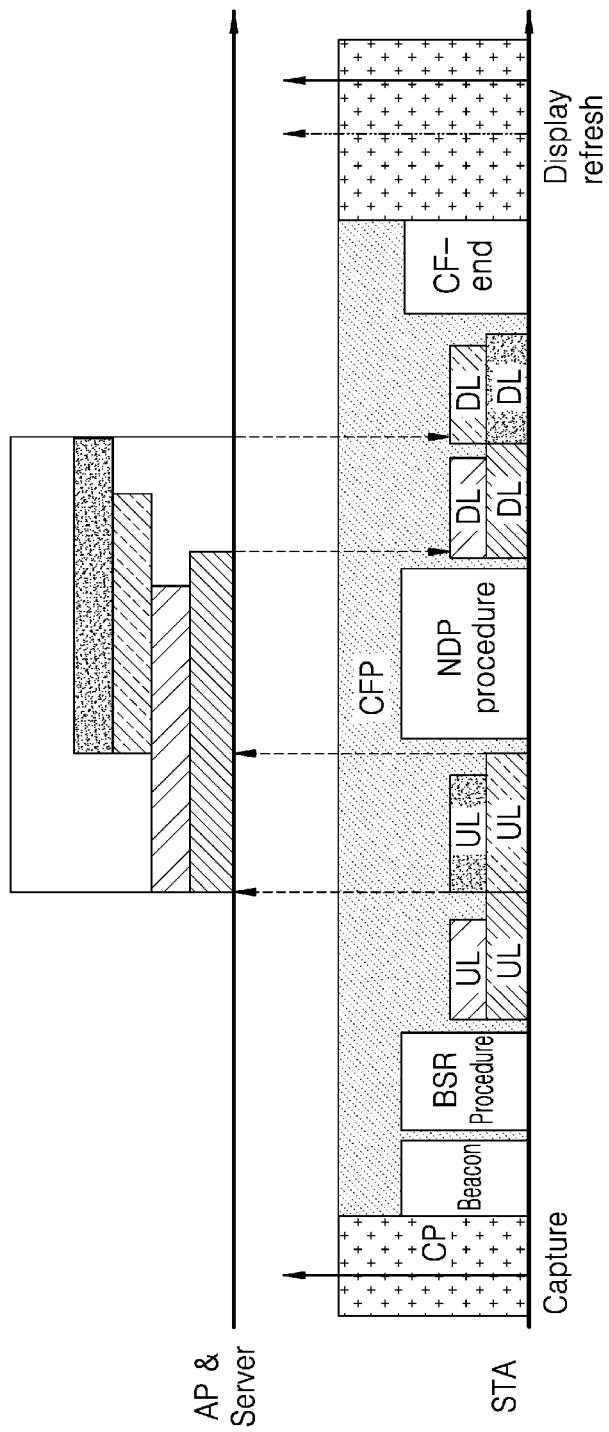
FIG. 5 is a view for describing a CFP according to an embodiment of the disclosure.

FIG. 5 is a view for describing a CFP according to an embodiment of the disclosure.

Referring to FIG. 5, the start of the CFP may be declared through a beacon. The beacon may include an Element ID field, a Length field, a CFP Count field, a CFP Period field, a CFP MaxDuration field, and a CFP DurRemaining field.

The CFP Count field may indicate the number of remaining DTIM beacon frames to be transmitted before start of the CFP. The DTIM beacon frame, which is a previously transmitted frame to release a power saving mode of the AR device STA immediately before the electronic device AP transmits a multicast/broadcast frame to the AR device STA, may be used to indicate the remaining time until the start of the CFP in an embodiment of the disclosure. For example, when the CFP Count field is 0, the CFP may start immediately after transmission of the beacon, and when the CFP Count field is 3, the CFP may start after transmission of three DTIM beacon frames.

The CFP Period field is a field indicating the number of DTIM intervals, each of which is an interval between at least one DTIM beacon frame existing between start time points of two consecutive CFPs. For example, the CFP Period field may indicate an interval between start time points of two consecutive CFPs.

The CFP MaxDuration field may be a field indicating a maximum duration of the CFP. A unit of the CFP MaxDuration value may be a time unit, in which 1 time unit may correspond to 1.024 ms based on the 802.11 standards. A value of the CFP MaxDuration field may be set to a channel occupation time (NAV) during which a channel may not be occupied by at least one AR device STA.

The CFP DurRemaining field may be a field indicating the remaining period in the CFP. A unit of the CFP MaxDuration value may be a time unit, in which 1 time unit may correspond to 1.024 ms based on the 802.11 standards.

Referring to FIG. 5, in a BSR procedure, the electronic device AP may transmit a BSR poll trigger frame to the AR device STA. Thereafter, each AR device STA may include UL information thereof waiting to be transmitted in a BSR frame and transmit the BSR frame to the edge server through the electronic device AP.

In an embodiment of the disclosure, the AR traffic allocation operation may further include an UL grouping operation of grouping at least one UL traffic in an MU-MIMO transmission scheme based on the identified UL information to reduce the sum airtime of the at least one UL traffic and generating at least one UL traffic group. The UL traffic transmission operation may include an operation of transmitting the at least one UL traffic group to the edge server.

Figure 6A:
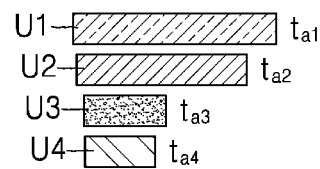
FIGS. 6A, 6B, and 6C are views for describing an airtime of an UL/DL traffic, according to an embodiment of the disclosure.
Figure 6B:
Figure 6C:
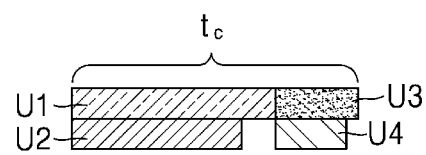

FIGS. 6A, 6B, and 6C are views for describing an airtime of UL/DL traffic, according to an embodiment of the disclosure.

Referring to FIG. 6A, each UL traffic may have an airtime. For example, first UL traffic U1 may have a first airtime $t_{a1}$, second UL traffic U2 may have a second airtime $t_{a2}$, third UL traffic U3 may have a third airtime $t_{a3}$, and fourth UL traffic U4 may have a fourth airtime $t_{a4}$.

Referring to FIG. 6B, each UL traffic group grouped in the MU-MIMO transmission scheme may have a group airtime. The group airtime may be determined as the longest airtime among airtimes of UL traffics included in each UL traffic group. For example, a first UL traffic group into which the first UL traffic UL1 and the second UL traffic UL2 are grouped may have a first group airtime $t_{b1}$, and a second UL traffic group into which the third UL traffic U3 and the fourth UL traffic U4 are grouped may have a second group airtime $t_{b2}$. The first group airtime $t_{b1}$ may be the same as the first airtime $t_{a1}$ that is the airtime of the first UL traffic U1, and the second group airtime $t_{b2}$ may be the same as the third airtime $t_{a3}$ that is the airtime of the third UL traffic U3.

Referring to FIG. 6C, a time required for transmitting grouped UL traffics may be indicated as a sum airtime. The sum airtime may correspond to a sum of group airtimes of all UL traffic groups. In the embodiment of the disclosure shown in FIG. 6C, a sum airtime $t_c$ may correspond to a sum of the first group airtime $t_{b1}$ and the second group airtime $t_{b2}$. ($t_c = t_{b1} + t_{b2}$)

In an embodiment of the disclosure, in the UL grouping operation, an airtime of each of a plurality of UL traffics may be identified and then UL traffics having similar airtimes may be grouped to reduce an UL sum airtime.

In the UL traffic transmission operation, the electronic device AP may transmit at least one UL traffic group to the edge server in order of shortest airtime to secure a decoding time of DL traffic, instead of transmitting the at least one UL traffic group to the edge server at random.

FIGS. 7A and 7B are views for describing a length of a group airtime and a traffic transmission order of a UL traffic group, according to an embodiment of the disclosure.

Referring to FIG. 7A, in the UL traffic transmission operation, a plurality of UL traffic groups may be transmitted in order of shortest group airtime. In this case, the edge server may fast start task processing (e.g., interference) with respect to some UL traffic groups, and DL traffic generated by task processing may be quickly transmitted to a plurality of AR devices STA, thereby sufficiently securing a time for decoding some DL traffics in the AR devices STA.

For example, a group airtime of the first UL traffic group into which the first UL traffic UL1 and the third UL traffic UL3 are grouped may be shorter than a group airtime of the second UL traffic group into which the second UL traffic U2 and the fourth UL traffic U4 are grouped. When the first UL traffic group is transmitted earlier than the second UL traffic group, task processing P1 and P3 with respect to the first UL traffic U1 and the third UL traffic U3 may start fast, and first DL traffic D1 and third DL traffic D3 generated by the task processing P1 and P3 may be quickly transmitted to each AR device STA. The at least one AR device STA having received the first DL traffic D1 or the third DL traffic D3 may secure a decoding time of $(t_0-t_1)$. Task processing P2 and P4 with respect to the second UL traffic U2 and the fourth UL traffic U4 may be performed after completion of transmission of the second UL traffic group, and second DL traffic D2 and fourth DL traffic D4 generated by the task processing P2 and P4 may be transmitted to at least one AR device STA after completion of the task processing P2 and P4. The at least one AR device STA having received the second DL traffic D2 or the fourth DL traffic D4 may secure a decoding time of $(t_0-t_2)$.

Referring to FIG. 7B, in the UL traffic transmission operation, a plurality of UL traffic groups may be transmitted in order of longest group airtime. In this case, the edge server may start task processing with respect to UL traffic groups late as a whole. Moreover, as DL traffic generated by task processing is transmitted late to the plurality of AR devices STA as a whole, a time for decoding the DL traffic may not be sufficiently secured in the AR devices STA.

For example, a group airtime of the first UL traffic group into which the second UL traffic UL2 and the fourth UL traffic UL4 are grouped may be longer than a group airtime of the second UL traffic group into which the first UL traffic U1 and the third UL traffic U3 are grouped. When the first UL traffic group is transmitted earlier than the second UL traffic group, the task processing P2 and P4 with respect to the second UL traffic U2 and the fourth UL traffic U4 may be performed after completion of transmission of the first UL traffic group, and the second DL traffic D2 and the fourth DL traffic D4 generated by the task processing P2 and P4 may be transmitted to at least one AR device STA after completion of the task processing P2 and P4. The at least one AR device STA having received the second DL traffic D2 or the fourth DL traffic D4 may secure a decoding time of $(t_0-t_1')$. Task processing P1 and P3 with respect to the first UL traffic U1 and the third UL traffic U3 may be performed after completion of transmission of the second UL traffic group, and first DL traffic D1 and third DL traffic D3 generated by the task processing P1 and P3 may be transmitted to at least one AR device STA after completion of the task processing P1 and P3. The at least one AR device STA having received the first DL traffic D1 or the third DL traffic D3 may secure a decoding time of $(t_0-t_2')$.

Comparing the embodiment of the disclosure shown in FIG. 7A with the embodiment of the disclosure shown in FIG. 7B, an average time for decoding DL traffic may not be sufficiently secured with transmission in order of longest group airtime when compared to with transmission in order of shortest group airtime. When the time for decoding the DL traffic is not sufficiently secured, a virtual object reflecting a user's motion at accurate time point and position may not be provided to an AR environment and user's satisfaction with the AR service may be degraded.

Thereafter, in an embodiment of the disclosure, the AR traffic allocation operation may further include a DL traffic transmission operation of receiving at least one DL traffic determined by processing of the at least one UL traffic from the edge server and transmitting the received at least one DL traffic to at least one AR device STA. In an embodiment of the disclosure, before declaration of end of the CFP through a CF-End frame, the at least one DL traffic may be transmitted to the at least one AR device STA. For example, after the plurality of DL traffics all are transmitted to the AR device STA through the electronic device AP, the end of the CFP may be declared through the CF-End frame.

Figure 8A:
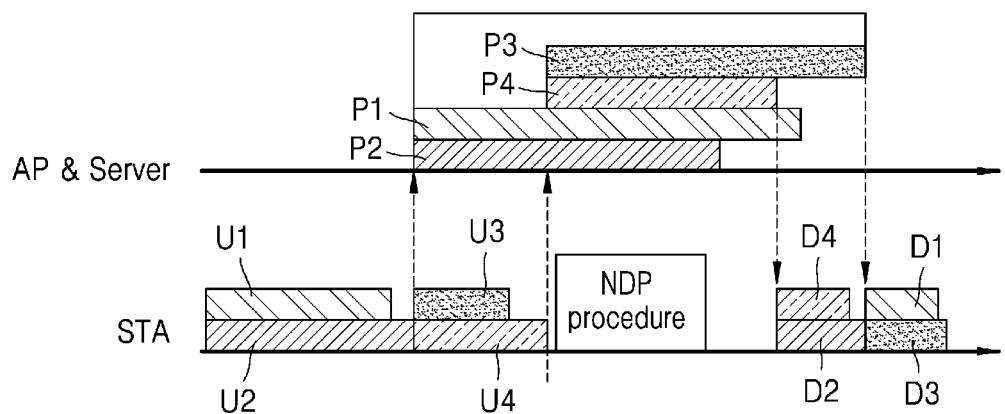
FIGS. 8A and 8B are views for describing a correlation between radio channels and a traffic transmission order of a plurality of AR devices, according to an embodiment of the disclosure.
Figure 8B:
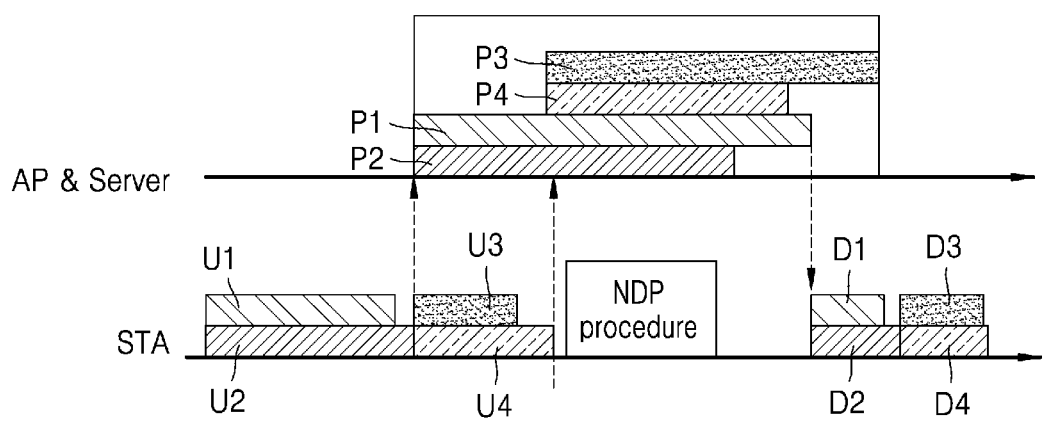

FIGS. 8A and 8B are views for describing a correlation and a traffic transmission order between radio channels of the plurality of AR devices STA, according to an embodiment of the disclosure.

Referring to FIGS. 8A and 8B, in the AR traffic allocation operation according to an embodiment of the disclosure, when the edge server performs task processing based on the plurality of UL traffics, null data physical layer protocol data unit (PPDU) (NDP) may be transmitted to the AR device STA to estimate radio channel information regarding the AR device STA or to identify correlation among the plurality of AR devices STA.

In an embodiment of the disclosure, the AR traffic allocation operation may further include the DL grouping operation of grouping at least one DL traffic in the MU-MIMO transmission scheme in an order in which processing is finished from the edge server, and generating at least one DL traffic group. In this case, the DL traffic transmission operation may include an operation, performed by the electronic device AP, of transmitting the at least one DL traffic group to the at least one AR device STA.

In an embodiment of the disclosure, the DL grouping operation may include grouping, performed by the electronic device AP, the at least one DL traffic based on a correlation between radio channels of the at least one AR device STA. For example, a grouping scheme for DL traffics may differ with correlation among radio channels of the plurality of AR devices STA. Correlation between radio channels may be determined based on relative positions of the plurality of AR devices STA, relative positions between the electronic device AP and the AR devices STA, a wireless communication environment, etc. When there is correlation between two channels, reconstruction accuracy of a received signal may be degraded, lowering communication performance. Thus, a way to group DL traffics needs to vary with a correlation between radio channels corresponding to at least one AR device STA.

Referring to FIG. 8A, in the absence of correlations among radio channels respectively corresponding to the plurality of AR devices STA, for example, when a plurality of radio channels are orthogonal to one another, the electronic device AP may group DL traffics in an order in which task processing P1, P2, P3, and P4 are finished from the edge server. For example, when task processing is finished in order of P2-P4-P1-P3, the second DL traffic D2 and the fourth DL traffic D4 may be grouped into the first DL traffic group and the first DL traffic D1 and the third DL traffic D3 may be grouped into the second DL traffic group. Thereafter, through the DL traffic transmission operation, grouped DL traffic groups may be immediately transmitted to at least one AR device STA.

In an embodiment of the disclosure, when DL traffics are grouped based on airtimes like in the above-described UL traffic grouping operation, all DL traffics have to wait until task processing with respect to all UL traffics is finished, and in this case, output delay of the AR device STA may occur. Thus, it may be desirable to apply a scheme that is different from an operation of grouping UL traffics to an operation of grouping DL traffics. According to an embodiment of the disclosure, DL traffics may be grouped and transmitted based on an order in which they are generated.

Referring to FIG. 8B, when there are correlations among some of a plurality of radio channels, e.g., when some of the plurality of radio channels are orthogonal to one another, the electronic device AP may preferentially group DL traffics having low correlations based on the correlations among the plurality of radio channels. For example, the electronic device AP may preferentially group DL traffics corresponding to radio channels having no correlation or little (orthogonal) influence among DL traffics that may be scheduled after completion of task processing from the edge server. The DL traffics having been grouped may be respectively transmitted to the AR devices STA.

Thereafter, the electronic device AP may re-identify correlations among radio channels for new DL traffics that may be scheduled after completion of task processing from the edge server and at least one DL traffic failing to be grouped in a previous grouping operation. The electronic device AP may preferentially group DL traffics having low correlations based on the correlations among the plurality of radio channels. Such a series of processes may be repeated until all DL traffics are transmitted.

Referring to FIG. 8B, task processing may be completed in the edge server in order of P2-P4-P1-P3. After completion of fourth task processing P4, the electronic device AP may identify correlations among radio channels. When it is determined that radio channels respectively corresponding to the second DL traffic D2 and the fourth DL traffic D4 have correlations, the electronic device AP may wait for completion of next task processing (first task processing P1). After completion of first task processing P1, the electronic device AP may re-identify correlations among radio channels. When it is determined that the radio channels respectively corresponding to the first DL traffic D1 and the second DL traffic D2 have no correlation or have the lowest correlation among correlations of waiting DL traffics, the electronic device AP may group the first DL traffic D1 and the second DL traffic D2 into the first DL traffic group for transmission to at least one AR device STA. After completion of third task processing P3, the electronic device AP may re-identify correlations among radio channels and determine that radio channels respectively corresponding to the third DL traffic D3 and the fourth DL traffic D4 have no correlation or a low correlation and thus may group the third DL traffic D3 and the fourth DL traffic D4 into the second DL traffic group for transmission to the at least one AR device STA.

Therefore, according to an embodiment of the disclosure, DL traffics may be grouped and transmitted to reduce a time required for transmitting the DL traffics as a whole while considering correlations among a plurality of radio channels.

Examples of the disclosure may be implemented by hardware, software, firmware, middleware, microcode, hardware technical language, or any combination thereof. When implemented in software, firmware, middleware or microcode, program code or code segments that perform required tasks may be stored in a computer-readable storage medium and may be executed by one or more processors. Moreover, embodiments of the disclosure may be performed in a distributed computing environment where tasks are performed by remote processing devices linked through a communication network. In the distributed computing environment, program modules may be located in local and remote computer storage media including memory storage devices.

Figure 9:
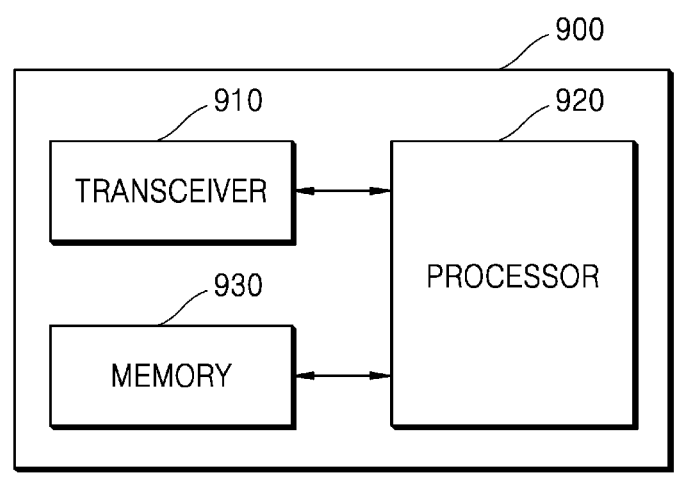
FIG. 9 is a block diagram schematically showing a structure of an electronic device according to an embodiment of the disclosure.

FIG. 9 is a block diagram schematically showing a structure of an electronic device 900 according to an embodiment of the disclosure.

Referring to FIG. 9, the electronic device 900 may include a transceiver 910, a processor 920, and memory 930. All components shown in FIG. 9 are not essential components of the electronic device 900. The electronic device 900 may be implemented by components that are more or less than the components shown in FIG. 9. In an embodiment of the disclosure, the transceiver 910, the processor 920, and the memory 930 may be implemented in the form of a single chip. The processor 920 may include one or more processors. In an embodiment of the disclosure, the electronic device 900 may be an AP device.

The transceiver 910, which is a generic term for a receiver of the electronic device 900 and a transmitter of the electronic device 900, may transmit and receive signals to and from a terminal, a station (STA), an AR device, an edge server, or various network entities. A signal transmitted and received through the transceiver 910 may include control information and data.

The transceiver 910 may perform functions for transmitting and receiving a signal through a radio channel. For example, the transceiver 910 may receive a signal through a radio channel to output the same to the processor 920, and transmit a signal output from the processor 920 through the radio channel.

The memory 930 may store programs and data required for an operation of the electronic device 900. For example, to control the operation of the electronic device 900, a program to be executed by the processor 920 described below may be stored. The memory 930 may store a program including at least one instruction for controlling an operation of the electronic device 900. The memory 930 may store instructions and program codes, which are readable by the processor 920. In an embodiment of the disclosure, the processor 920 may be implemented to execute instructions or codes of a program stored in the memory 930. The memory 930 may store control information or data included in a signal obtained in the electronic device 900. For example, the memory 930 may store data input to or output from the electronic device 900.

The memory 930 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or the like. However, the memory 930 is not limited to the above-described example, and may include any type of storage medium in which data may be stored. The memory 930 may be configured as being included in the processor 920, instead of being provided separately. The memory 930 may be configured as volatile memory, non-volatile memory, or a combination thereof. The memory 930 may provide stored data at the request of the processor 920.

The processor 920 may control a series of processes to allow the electronic device 900 to operate according to the above-described embodiment of the disclosure. For example, the processor 920 may receive a control signal and a data signal through the transceiver 910 and process the received control signal and data signal. The processor 920 may transmit the processed control signal and data signal through the transceiver 910. The processor 920 may record or read data on or from the memory 930. The processor 920 may perform functions of a protocol stack required in communication standards. To this end, the processor 920 may include at least one processor or microprocessor. In an embodiment of the disclosure, a part of the transceiver 910 or the processor 920 may be referred to as a communication processor (CP). In this case, the processor 920 may include a general-purpose processor such as a CPU, an application processor (AP), a digital signal processor (DSP), etc., a graphic-dedicated processor such as a GPU, a vision processing unit (VPU), etc., or an AI-dedicated processor such as a neural processing unit (NPU). For example, when one processor or a plurality of processors include an AI-dedicated processor, the AI-dedicated processor may be designed as a hardware structure specialized for processing a specific AI model. The processor 920 may control processing of input data derived from the received control signal and data signal, according to an artificial intelligence (AI) model.

In an embodiment of the disclosure, the processor 920 of the electronic device 900 may schedule DL/UL traffic for a WLAN-based AR service by executing at least one instruction stored in the memory 930. For example, the processor 920 may arrange a CP at both sides of a CFP in a preset I and allocate AR traffic including UL traffic and DL traffic to the CFP, by executing the at least one instruction stored in the memory 930.

An operation, performed by the processor 920, of arranging the CP at both sides of the CFP within the preset I may correspond to operation S100 of FIG. 1. An operation, performed by the processor 920, of allocating the AR traffic including the UL traffic and the DL traffic to the CFP may correspond to operation S200 of FIG. 1.

As such, according to an embodiment of the disclosure, by arranging the CP at both sides of the CFP within the preset I and allocating the AR traffic to the CFP, motion sickness caused by delay likely to occur when providing the AR service may be addressed and the accuracy of output time and position of a virtual object may be improved.

Various embodiments of the disclosure may be implemented or supported by one or more computer programs, and computer programs may be formed from computer-readable program code and recorded in computer-readable media. In the disclosure, an "application" and a "program" indicate one or more computer programs, software components, instruction sets, a procedure, a function, an object, a class an instance, related data, or a part thereof, which are suitable for implementation in computer-readable program code. The "computer-readable program code" may include various types of computer code including source code, purpose code, and executable code. The "computer-readable media" may include various types of media accessible by computers, such as ROM, RAM, hard disk drive (HDD), compact disc (CD), digital video disc (DVD), or various types of memory.

A machine-readable storage medium may be provided in the form of a non-transitory storage medium. Here, a 'non-transitory storage medium' is a tangible device and may exclude wired, wireless, optical, or other communication links that transmit temporary electrical or other signals. Meanwhile, the 'non-transitory storage medium' may not distinguish a case where data is stored semi-permanently in the storage medium from a case where data is temporarily stored in the storage medium. For example, the 'non-transitory storage medium' may include a buffer in which data is temporarily stored. A computer-readable recording medium may be an available medium that is accessible by a computer, and includes all of a volatile medium, a non-volatile medium, a separated medium, and a non-separated medium. Computer-readable media may include media in which data may be permanently stored and media on which data may be later overwritten after stored, such as rewritable optical disks or erasable memory devices.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be electronically distributed (e.g., downloaded or uploaded) via an application store or directly between two user devices (e.g., smartphones). When distributed online, at least a part of the computer program product (e.g., a downloadable app) may be at least temporarily stored or temporarily generated in the machine-readable storage medium, such as memory of the manufacturer's server, a server of the application store, or a relay server.

Those of ordinary skill in the art to which the disclosure pertains will appreciate that the disclosure may be implemented in different detailed ways without departing from the technical spirit or essential characteristics of the disclosure. For example, even when described techniques are performed in a sequence different from the described method and/or components such as systems, structures, devices, circuits, etc. are combined or connected differently from the described method, or replaced with other components or equivalents, an appropriate result may be achieved. Accordingly, the aforementioned embodiments of the disclosure should be construed as being only illustrative, but should not be constructed as being restrictive from all aspects. For example, each element described as a single type may be implemented in a distributed manner, and likewise, elements described as being distributed may be implemented as a coupled type.

The scope of the disclosure is defined by the following claims rather than the detailed description, and the meanings and scope of the claims and all changes or modified forms derived from their equivalents should be construed as falling within the scope of the disclosure.

What is claimed is:

1. A method, performed by an electronic device, of scheduling downlink (DL)/uplink (UL) traffic for an augmented reality (AR) service based on a wireless local area network (WLAN), the method comprising:
 a period arrangement operation of arranging a contention period (CP) at both sides of a contention free period (CFP) in a preset capture interval (I); and
 an AR traffic allocation operation of allocating AR traffic, comprising UL traffic and DL traffic, to the CFP.

2. The method of claim 1, further comprising a non-AR traffic allocation operation of allocating non-AR traffic to the CP.

3. The method of claim 1, wherein the AR traffic allocation operation comprises:
 an UL information identification operation of identifying UL information received from at least one AR device through a buffer state report (BSR) frame, after declaration of start of the CFP; and
 an UL traffic transmission operation of transmitting at least one UL traffic to an edge server based on the identified UL information.

4. The method of claim 3, wherein the AR traffic allocation operation further comprises an UL grouping operation of grouping the at least one UL traffic using a multi-user multiple input multiple output (MU-MIMO) transmission scheme based on the identified UL information and generating at least one UL traffic group, and the UL traffic transmission operation further comprises an operation of transmitting the at least one UL traffic group to the edge server.

5. The method of claim 4, wherein the UL traffic transmission operation comprises transmitting the at least one UL traffic group to the edge server in order of shortest group airtime to secure a decoding time of the DL traffic.

6. The method of claim 1, wherein the AR traffic allocation operation comprises a DL traffic transmission operation of receiving at least one DL traffic determined by processing at least one UL traffic from the edge server, and transmitting the received at least one DL traffic to at least one AR device, and the at least one DL traffic is transmitted to the at least one AR device before declaration of end of the CFP through a contention free end (CF-End) frame.

7. The method of claim 6, wherein the AR traffic allocation operation further comprises a DL grouping operation of grouping the at least one DL traffic using a multi-user multiple input multiple output (MU-MIMO) transmission scheme in order in which processing is finished from the edge server, and generating at least one DL traffic group, and the DL traffic transmission operation comprises transmitting the at least one DL traffic group to the at least one AR device.

8. The method of claim 7, wherein the DL grouping operation comprises grouping the at least one DL traffic based on a correlation between radio channels of the at least one AR device.

9. An electronic device for scheduling downlink (DL)/uplink (UL) traffic for an augmented reality (AR) service based on a wireless local area network (WLAN), the electronic device comprising:

a transceiver;

a memory storing at least one instruction; and at least one processor configured to execute the at least one instruction stored in the memory, wherein the processor is further configured to, by executing the at least one instruction:

arrange a contention period (CP) at both sides of a contention free period (CFP) in a preset capture interval (I); and allocate AR traffic comprising UL traffic and DL traffic to the CFP.

10. A non-transitory recording medium having recorded thereon a program for executing the method of claim 1 on a computer.

* * * * *